Sept. 16, 1952 F. C. YOUNG 2,610,849
MECHANISM FOR IMPARTING RECTILINEAR MOVEMENT TO A MEMBER
Filed Dec. 14, 1949 6 Sheets-Sheet 1

INVENTOR
F. C. Young
By Watson, Cole, Grindle & Watson

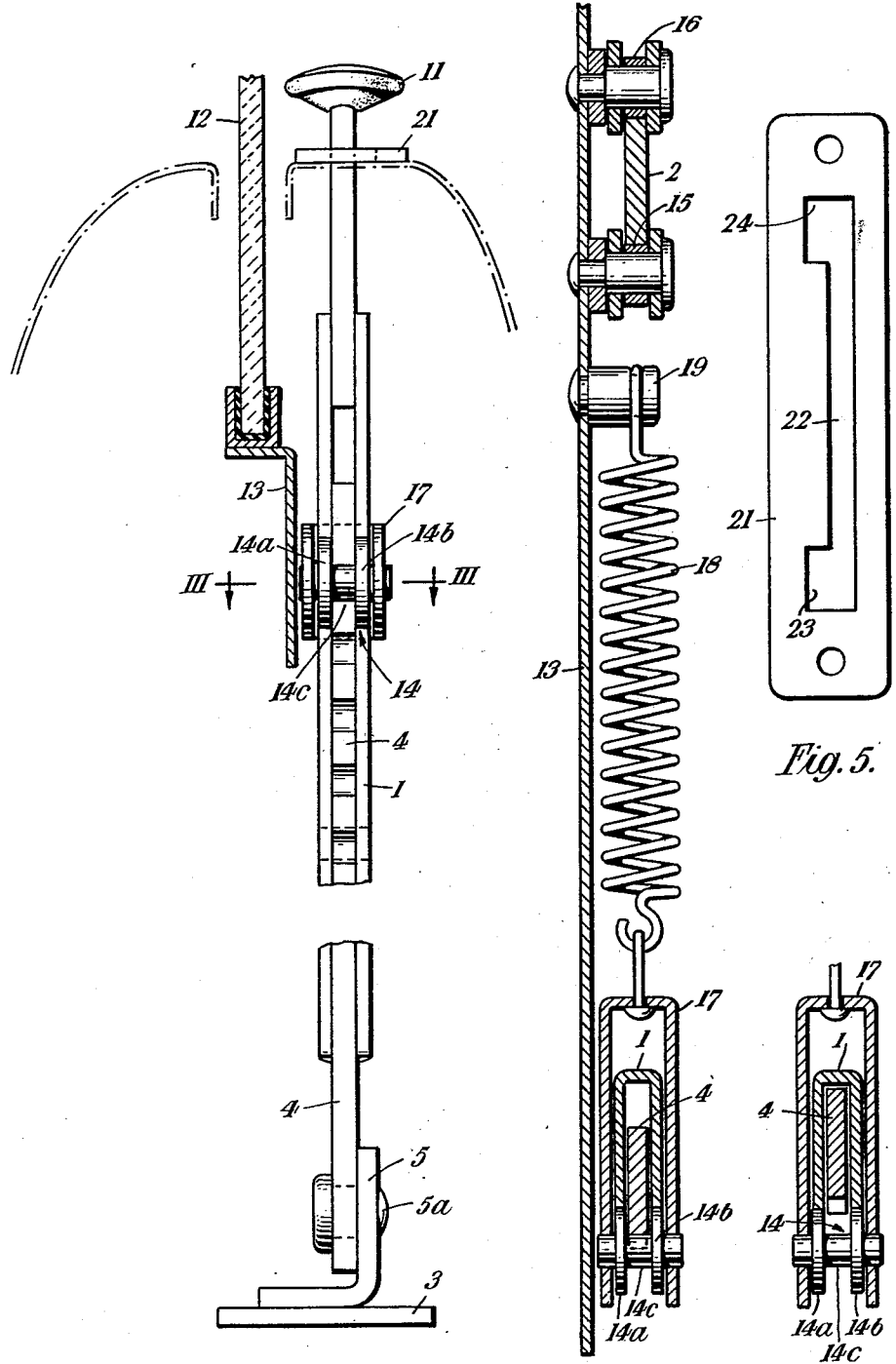

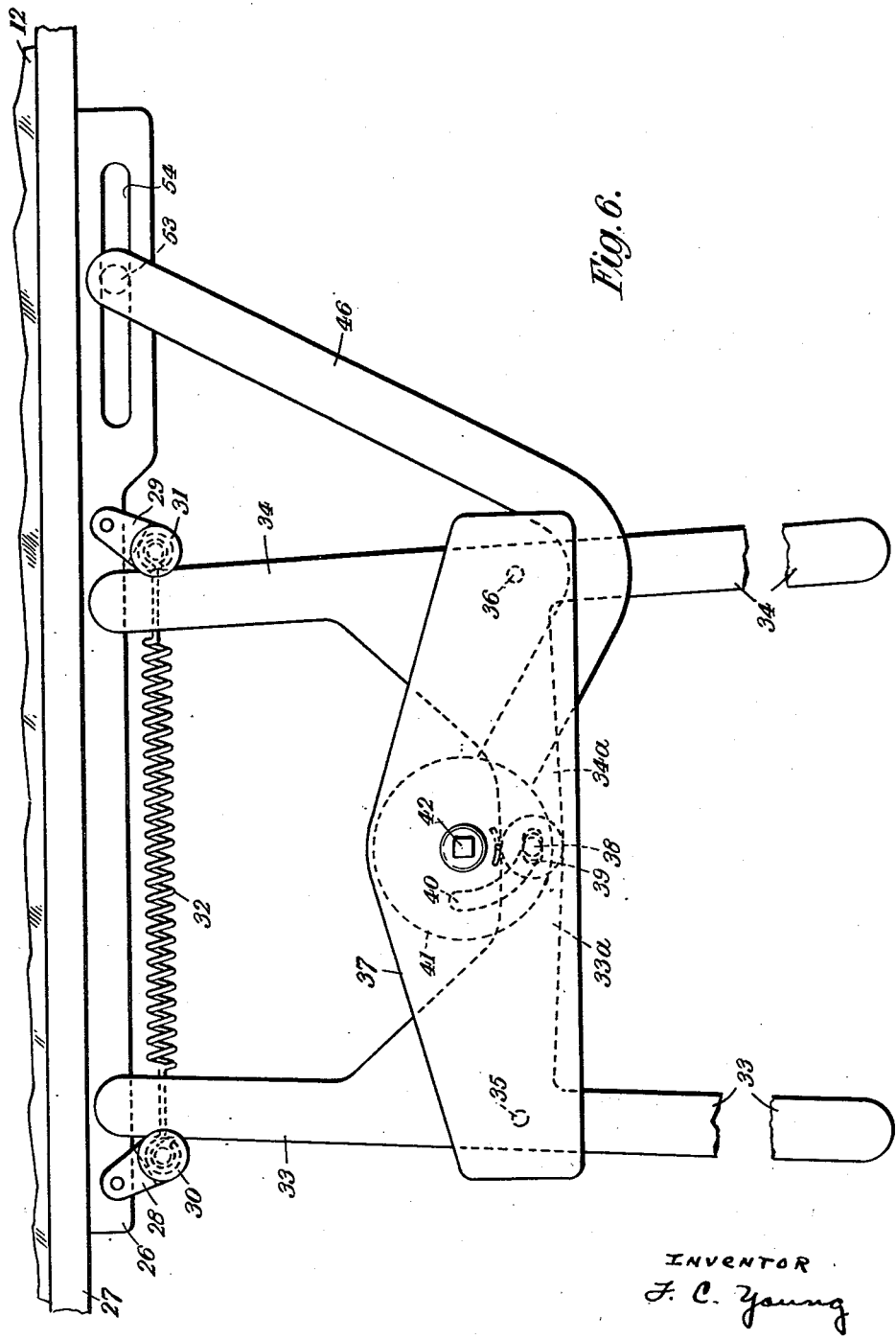

Sept. 16, 1952        F. C. YOUNG        2,610,849
MECHANISM FOR IMPARTING RECTILINEAR MOVEMENT TO A MEMBER
Filed Dec. 14, 1949        6 Sheets-Sheet 4
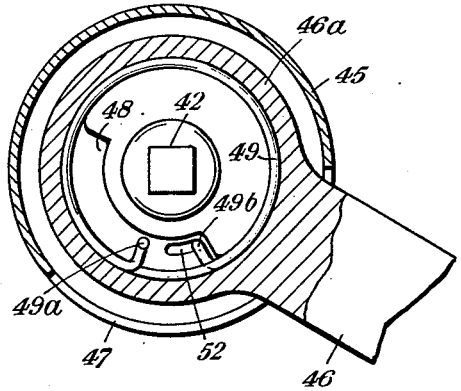
Fig. 8.
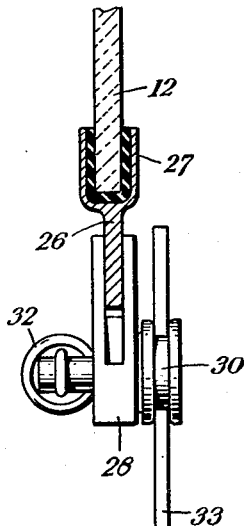
Fig. 7.
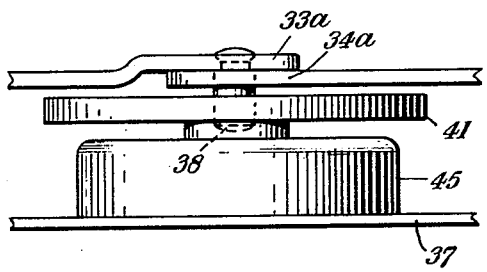
Fig. 9.
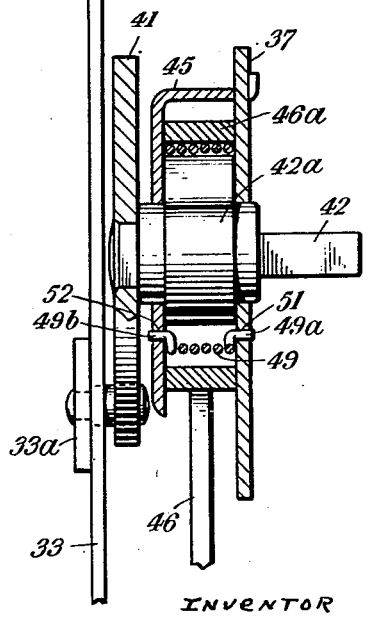
INVENTOR
F. C. Young
By Watson, Cole, Grindle & Watson Sept. 16, 1952      F. C. YOUNG      2,610,849
MECHANISM FOR IMPARTING RECTILINEAR MOVEMENT TO A MEMBER
Filed Dec. 14, 1949      6 Sheets-Sheet 5

INVENTOR
F. C. Young
By Watson, Cole, Grindle & Watson

Patented Sept. 16, 1952

2,610,849

UNITED STATES PATENT OFFICE 2,610,849

MECHANISM FOR IMPARTING RECTILINEAR MOVEMENT TO A MEMBER

Frederick Charles Young, Willesden, London, England, assignor of one-half to George Beaton and Son Limited, London, England Application December 14, 1949, Serial No. 132,810
In Great Britain December 17, 1948

9 Claims. (Cl. 268—122)

The present invention relates to a new or improved mechanism for imparting rectilinear movement to a member. It is of particular utility as window operating mechanism, more especially for use in a motor vehicle, but as indicated below, it has many other useful applications.

The vertically sliding windows of motor vehicles often require considerable effort to operate them, and one of the objects of this invention is to provide a sliding window which will move easily and is either moved by springs or balanced by springs against its weight.

According to the invention the mechanism comprises in combination with the member to be moved, a pair of guide bars extending in a common plane in a direction generally in the direction of movement of the member, said guide bars being relatively adjustable between positions in which they converge towards the member and diverge from the member, and a pair of rollers, supported on opposite sides of the said member and arranged to engage the said guide bars, and spring operated means for urging the rollers into contact with the corresponding guide bars.

In the above arrangement the reaction of the relatively inclined guides on the rollers, due to the spring operated means, has a component tending to move the said member along the guide bars. In the case of a vertically sliding window the spring operated means may be arranged to balance the weight of the window so that the window may be raised or lowered with slight finger pressure.

In order that the invention may be more readily understood reference will be made to the accompanying drawings which show by way of example preferred embodiments thereof as applied to the sliding window of a vehicle door.

In the drawings:

Figure 2 is a side elevational view on an enlarged scale, of the mechanism shown in Figure 1.

Figure 3 is a sectional view on an enlarged scale, on the line III—III of Figures 1 and 2 looking from above.

Figure 4 is a sectional view on an enlarged scale through one of the guide members.

Figure 5 is a plan view on an enlarged scale of a control plate for a guide bar.

Figure 6 is a front elevational view of a modified arrangement of the window operating mechanism.

Figure 7 is a side elevational view partly in section of the mechanism shown in Figure 6.

Figure 8 is a sectional view taken on the line VIII—VIII of Figure 7.

Figure 9 is a plan view of part of Figure 6.

In the drawings like references designate the same or similar parts.

Figure 1:
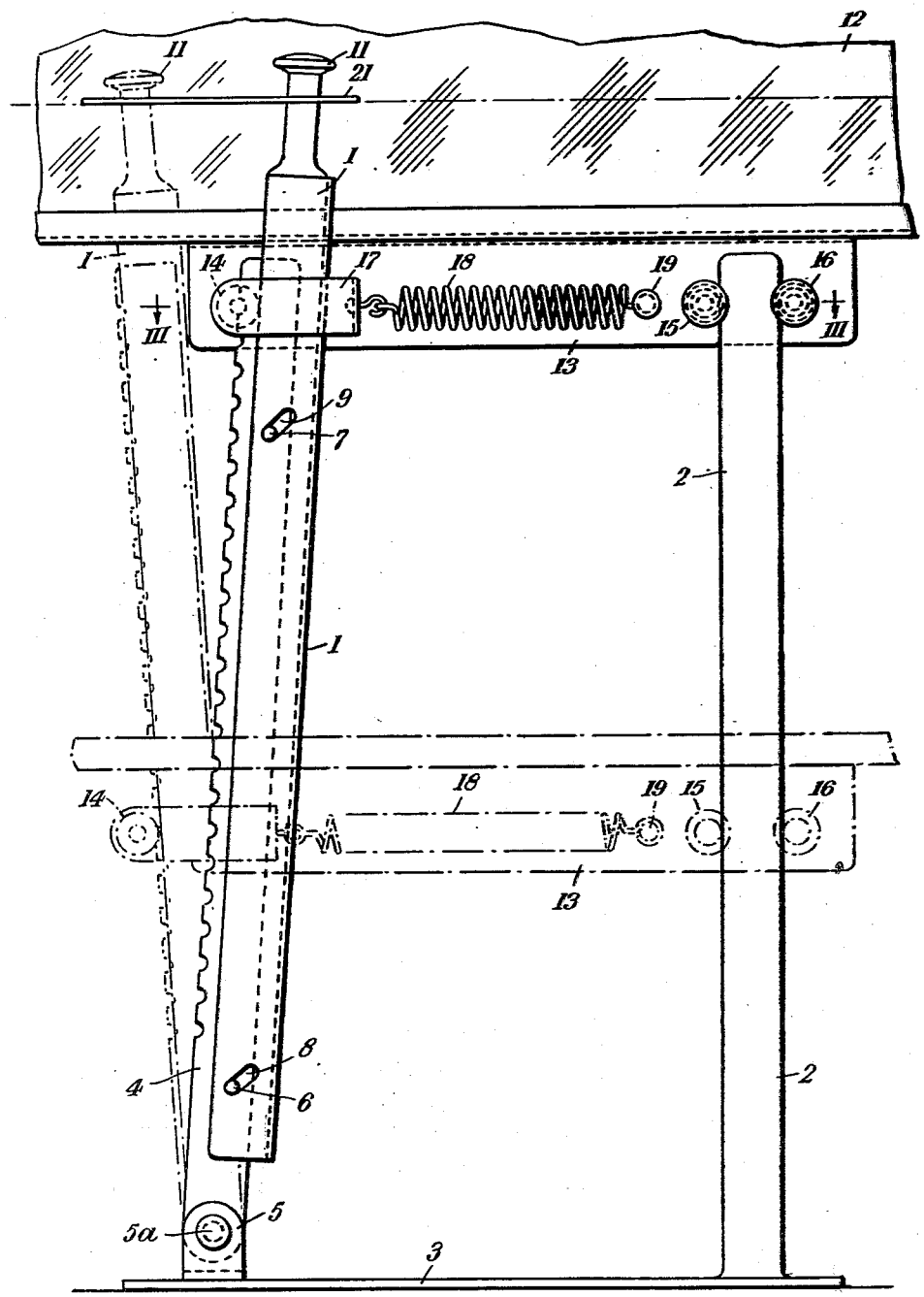
Figure 1 is a front elevational view of a window operating mechanism adapted for mounting in the framework of a vehicle door.

Referring to Figure 1 the mechanism comprises a pair of guide bars 1 and 2. The guide bar 2 is fixed in an upright position on a base member 3 attached to the framework of a door. The guide bar 1 is mounted on a notched bar 4 pivoted at 5a to a bracket 5 on the base member 3, and together with the bar 4 is free to swing about the said pivot. The guide bar 1 is made of channel shaped section more clearly seen in Figure 3 and the notched bar 4 is partly housed within the guide bar. The notched bar 4 carries a pair of projecting pins 6 and 7 which engage in parallel slots 8 and 9 in the guide bar and allow the guide bar to move in relation to and parallel with the notched bar. For the reason hereinafter described the pins 6 and 7 are biassed towards the bottom of the slots 8 and 9 and the notched bar 4 projects from the channel shaped guide bar 1 to the full extent permitted by the slots as shown in Figure 1 (full lines) and Figure 3. The guide bar 1 is provided with a handle 11 and when downward pressure is applied to the handle, the pins 6 and 7 move up the slots 8 and 9 and the notched bar 4 is retracted into the channel shaped guide bar.

The window 12 is supported by a cradle 13 provided with a roller 14 which co-operates with the guide bar 4. The roller 14 is waisted so as to have its outer parts 14a and 14b running on the flanges of the guide bar 1 and its central waisted part 14c adapted to co-operate with the notched bar 4 as seen in Figure 3. The guide bar 1 can be swung by its handle from the position in which it converges with the guide bar 2, as shown in full lines in Figure 1, to the position in which it diverges from the guide bar 2, as shown in dot-and-pick lines in Figure 1.

The roller 14 is mounted in a stirrup 17 which is biassed towards the right of the window cradle 13 by means of a spring 18 anchored to a pin 19 projecting from the cradle.

If the handle 11 is depressed the notched bar 4 will be moved out of engagement with the waisted part 14c of the roller 14 as shown in dot-and-pick lines in Figure 1 and in Figure 4; if the guide bar 1 is converging with the guide bar 2 the roller 14 will run up the guide bar 1 and the cradle 13 will be raised, if the guide bar 1 is diverging from the guide bar 2 the roller 14 will run down the guide bar 1 and the cradle will be lowered. The speed with which the cradle moves is controlled by the extent to which the guide bar 1 is swung to one or other side of its vertical position. The cradle 13 can be stopped at any desired level by allowing the handle 11 to rise; this will cause the notched bar 4 to project from the guide bar as shown in dot-and-pick lines in Figure 1, the part 14c of the roller 14 will then enter the first notch it arrives at and be stopped thereby.

The guide bar 1 normally takes up its raised position, as due to the tension in the spring 18, the parts 14a and 14b of the roller 14 bear against the flanges of the guide bar and cause the pins 6 and 7 to move to the bottom of the slots 8 and 9.

For the purpose of retaining the guide bar 1 in either its converging or diverging relationship to guide bar 2, the handle 11 co-operates with a slotted escutcheon plate 21 mounted on the sill of the window frame. The plate 21 which is shown in Figure 5, has a slot 22 provided at one end with a recess 23, and at the other end with a recess 24. When the guide bars are in converging relationship the handle 11 occupies the recess 23 and when the guide bars are in diverging relationship the handle 11 occupies the recess 24.

In operation when it is desired to open the window, the handle 11 is depressed, if the handle is already at the right hand end of the slot 22 the window will rise without further manipulation of the handle, if the handle is at the left hand end of the slot the window will descend and it will be necessary to swing the handle to the other end of the slot to reverse the window movement. As soon as the handle is released the notched bar 4 will engage the roller 14 and the window will stop.

In the embodiment of the invention described with reference to Figures 6 to 9 the two guide bars are both arranged to move in synchronism. Referring to Figures 6 a cradle 26 fitted at the base of the frame 27 enclosing the window glass 12 has pivoted to it a pair of brackets 28 and 29 each carrying a roller 30 and 31. A strong tension spring 32 connecting the brackets holds the rollers against the outer faces of a pair of guide bars 33 and 34, pivoted midway in their length on pins 35 and 36, carried by a panel 37 mounted in the door beneath the window opening.

The guide bars 33 and 34 have overlapping extensions 33a and 34a extending inwardly from them, one extension 33a being joggled to lie behind the other, as shown in Figure 9. To the rear extension 33a is fixed a stud 38 which projects forwardly through an elongated slot 39, of the same diameter as the stud, in the other extension 34a, and into a cam slot 40 in a disc 41, fixed to a spindle 42 rotatably mounted in the panel 37. The spindle 42 is operated by a crank handle (not shown) on the inside of the door, and by turning the handle the disc 41 can be turned through 90°. When the stud 38 is at one end of the cam slot 40, the guide bar extensions 33a and 34a are inclined downwardly and the guide bars 33 and 34 converge towards the window, which tends to rise. When the handle has been turned through 90° to bring the stud 38 to the other end of the cam slot 40, the extensions 33a and 34a are lifted, the guide bars 33 and 34 diverge from the window and the window tends to drop.

The mechanism is provided with a braking device which will now be described with reference to Figures 7 and 8. A domed casing 45 is fitted on the inside of the panel 37, the spindle 42 extending through the casing 45. A lever 46 for holding the window in any desired position of adjustment extends through a slot 47 in the casing 45. The lever 46 has an apertured boss 46a surrounding and larger than the portion 42a of the spindle 42 within the casing 45. This portion 42a of the spindle has a circumferential slot 48 formed therein extending over somewhat more than 90°. Surrounding the portion 42a of the spindle is a coiled spring 49 the ends 49a and 49b of which are turned radially inwards into the slot 48 and then outwards parallel to the spindle, to engage respectively arcuate slots 51 and 52 in the panel 37 and in the end face of the casing 45 which extends parallel thereto. Normally the ends 49a and 49b of the spring abut against opposite ends of the arcuate slots 51 and 52 and the coiled spring is expanded against the inner face of the apertured boss 46a to hold the lever frictionally against rotation about the spindle 42. The outer end of the lever 46 carries a pin 53 (see Figure 6) engaging a longitudinal slot 54 in the cradle 26 fixed to the bottom of the window, so that when the lever 46 is held against rotation the window is prevented from moving. The coiled spring 49 normally holds the lever 46 frictionally against turning under the weight of the window and/or the action of the spring 32.

When the guide bars 33 and 34 are converging towards the window and the window tending to rise, one end of the circumferential slot 48 in the spindle 42 engages the radially inturned ends 49b of the spring. By turning the crank handle slightly in the appropriate direction (e. g. clockwise) the end 49b of the spring will be caused to travel along its associated arcuate slot 52, thereby collapsing the spring sufficiently for it to release its frictional grip on the lever 46 and allow the window to rise.

To lower the window, the crank handle is turned in the reverse direction (i. e. anti-clockwise) through 90°, thereby causing the cam slot to actuate the stud 38 and bring the guide bars 33 and 34 into the position in which they diverge towards the window and cause the other end of the circumferential slot 48 in the spindle 42 to approach the inturned end 49a of the spring. A further slight anti-clockwise rotation of the crank handle will move this inturned end 49a along its arcuate slot 52, so collapsing the spring 49 and allowing the window to fall.

Whether the mechanism is set for raising or lowering the window, slight pressure on the crank handle in the appropriate direction will collapse the spring 49 and allow the window to move, the spring 49 returning into frictional engagement with the lever boss 46a to hold the window against further movement immediately pressure on the handle is released.

The mechanism according to the above described embodiment has wide applications. In the motor industry it is particularly suited for operation of sliding windows, doors or roofs, or for opening and closing the bonnet, boot or folding head of a car. It has likewise wide application in other industries for moving a part from one position to another. Where desired, of course, the guide bars can be moved from converging to diverging relationship by remote control, and the rectilinear movement of the member coacting with the guide bars can, of course, by the interposition of suitable mechanism, be translated into pivotal or other desired movement of a part to be controlled by that member.

In the embodiment of the invention described with reference to Figures 10 to 13 the window guide bars are fixed and have upwardly diverging inclined surfaces, on their inner sides, which are engaged by outwardly projecting rollers on the window frame, the rollers being spring pressed outwardly so as to exert a component of thrust tending to lift the window.

Figure 10:
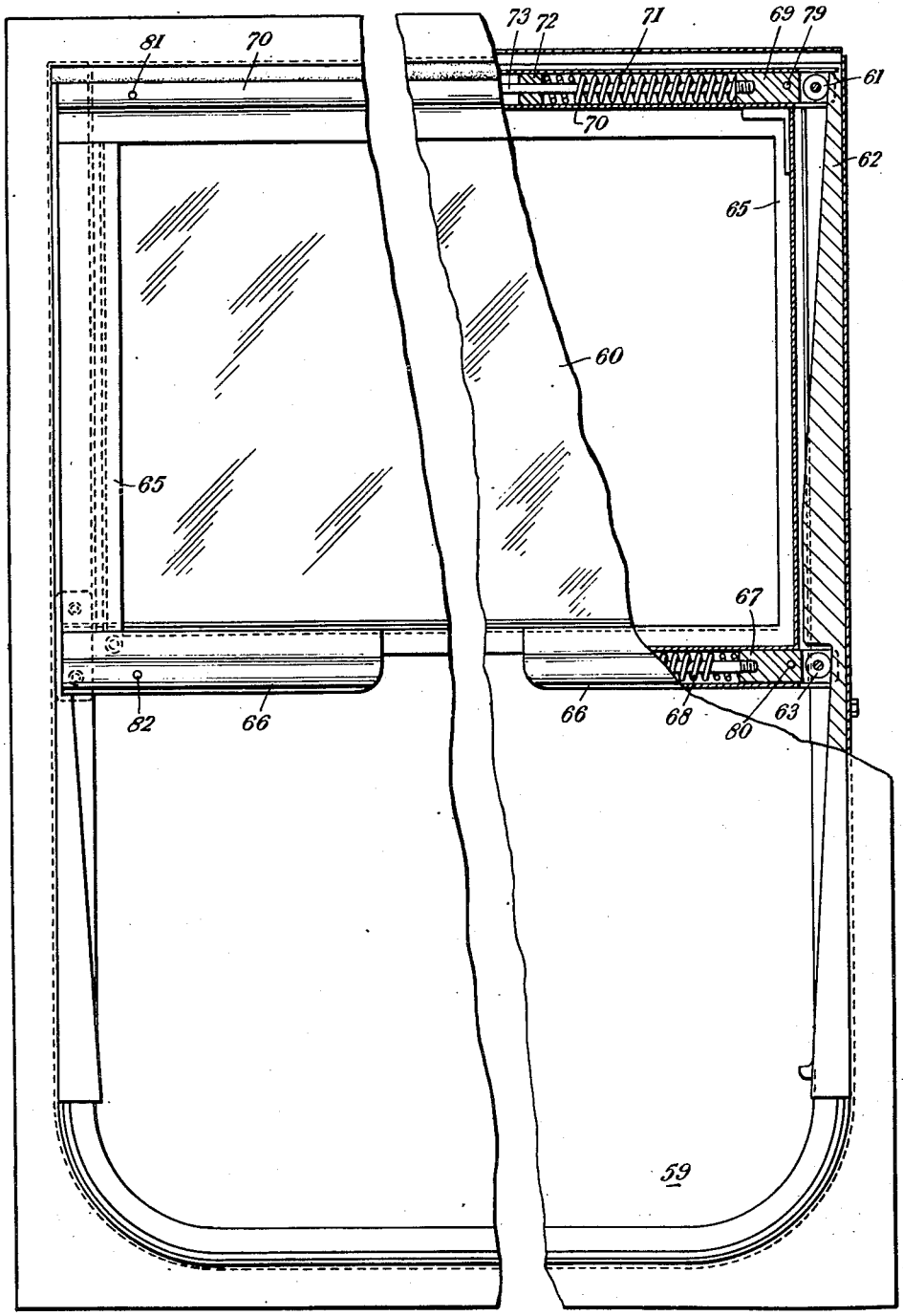
Figure 10 is a front elevational interrupted view of another arrangement of the window operating mechanism.

Figure 10 is a fragmentary view showing one side of a half drop window for a motor bus. In the drawing the bottom fixed window panel is omitted and only the sliding window panel 60 is shown; this panel carries a pair of opposed spring pressed rollers 61 which engage with a pair of upwardly diverging inclined window guide bars 62. A similar pair of rollers 63 and a similar pair of guide bars 64 are provided at the bottom of the window. The sliding window 60 is mounted in a metal frame 65. At each side of the lower edge of the frame 65 is a tubular housing 66 in which is mounted a plunger 67. The plunger 67 carries one of the rollers 63 engaging the window guide bar 64 and is spring urged towards the guide bar by a spring 68 compressed in the tubular housing 66. On the upper edge of the frame 65 is a tubular housing 70 which extends the whole length of the window panel 60. This housing carries at each end a plunger 69 on which is mounted one of the rollers 61. Each plunger 69 is urged outwardly by a spring 71 compressed between the plunger 69 and an abutment 72 in the tubular housing. Each plunger 69 also carries a rod 73 which extends inwardly along the housing 70 through a hole in each abutment 72.

Figure 11:
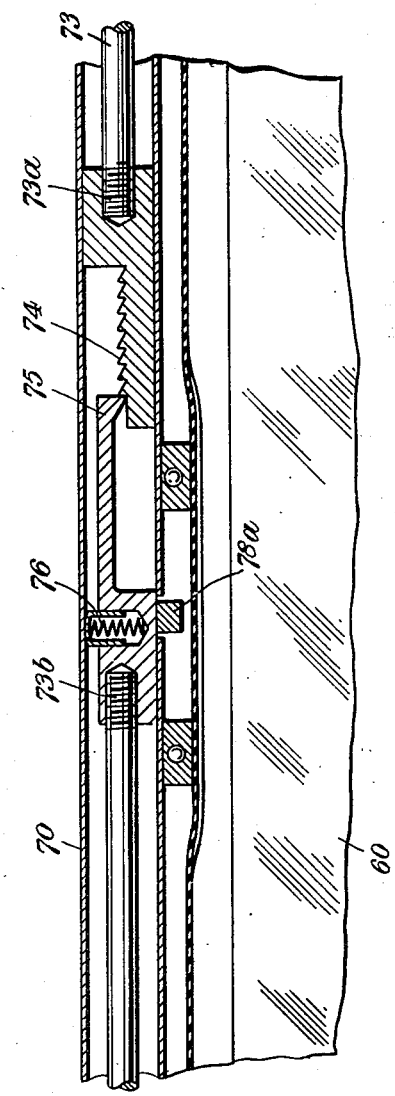
Figure 11 is a sectional view on an enlarged scale of part of the mechanism of Figure 10.
Figure 12:
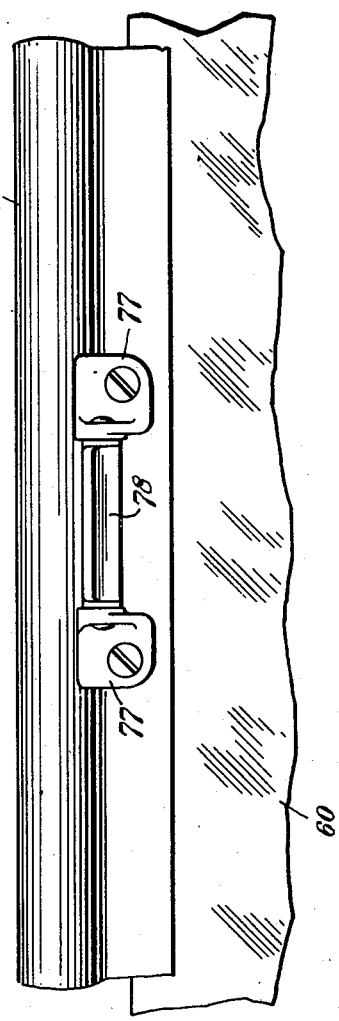
Figures 12 and 13 are respectively elevational and sectional views on an enlarged scale, of window release mechanism.
Figure 13:
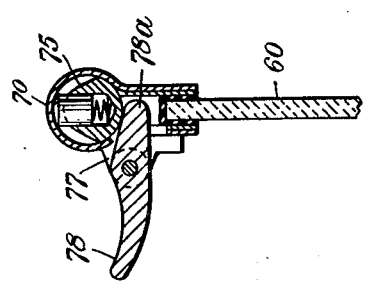

The inner ends 73a and 73b of the rods are connected to a ratchet mechanism which will now be described with reference to Figure 11. The inner end 73a of one rod has ratchet teeth 74 which are engageable by a single toothed member 75 on the inner end 73b of the other rod. The toothed member 75 is urged against the ratchet teeth 74 by a spring 76 which is housed in a transverse hole in the member 75 and bears against the inner wall of the tubular housing 70. The rack teeth 74 are so cut that the rods 73 can move outwards but not inwards in relation to each other. As the window panel 60 is raised therefore, the rods 73 will be moved out to spread the top rollers 61 and hold them firmly engaged with the guide bars 62.

A catch mechanism (see Figures 12 and 13) is mounted on the inside of the top member of the sliding window panel. This catch mechanism comprises a bracket 77 in which is pivoted a lever 78 having a projection 78a. The projection 78a projects through an aperture formed in the tubular housing 70 and bears against the toothed member 75. When the lever 78 is depressed, the projection 78a lifts the toothed member 75 away from the ratchet teeth 74. The window panel 60 being balanced wholly or partly by the springs 71, can then be raised or lowered by finger pressure on the catch. Immediately the catch is released, the toothed member 75 and the teeth 74 will be re-engaged by the transverse spring 76 to lock the rods 73 together. The window panel 60 cannot then descend due to vibration and can only be lowered by pressure on the catch.

When pressure on the catch lever 78 is released, the window panel 60 can be raised from outside the vehicle, the toothed member 75 sliding relatively to the ratchet teeth 74 so that the rods 73 may move out to lock the window panel 60 in its new position. Lowering of the window panel 60 can only be effected by displacing the catch lever 78.

When the window panel 60 is in its lower position, holes 79 and 80 in the plungers 69 and 67 come into register respectively with holes 81 and 82 in the tubular housings 70 and 66. Pins can be inserted into these holes from outside the window to maintain the springs 71 and 68 compressed. If the window panel 60 is then lifted again, the rollers 61 and 63 can be lifted clear of the frame 35 and the window panel 60 can be removed bodily in an outward direction.

In addition therefore to providing a sliding window which is spring balanced, and therefore finger light, this last embodiment of the invention provides a half drop window in which the sliding panel can be rapidly removed and replaced without the necessity of dismembering the window frame.

What I claim as my invention and desire to secure by Letters Patent is:

1. Mechanism for imparting rectilinear movement to a member in opposite directions comprising in combination with the member to be moved, a stationary frame element, a pair of guide bars connected to said frame element and extending in a common plane in a direction generally in the direction of movement of the said member, at least one of said guide bars being pivotally connected to said frame element so that the guide bars can be relatively adjusted between positions in which they converge towards each other and diverge from each other, a pair of rollers mounted on bearing means supported in spaced relationship on the said member so as to engage the said guide bars, and spring means effectively connecting said bearing means for urging the rollers into contact with the corresponding guide bars.

2. Mechanism for imparting rectilinear movement to a member in opposite directions comprising in combination with the member to be moved, a pair of guide bars extending in a common plane in the direction generally in the direction of movement of the said member, one of the said guide bars extending in a direction parallel to the direction of movement of the member and being fixed to a stationary frame element and the other of the said guide bars being pivoted to the same frame element and being adjustable between positions in which it converges towards the said member and diverges from the said member, a pair of rollers mounted on bearing means supported in spaced relationship on the said member so as to engage the said guide bars, one of the rollers engaging the fixed guide bar and the other of the rollers engaging the pivoted guide bar, and spring means effectively connecting said bearing means for urging the rollers into contact with the corresponding guide bars.

3. Mechanism as claimed in claim 2 in which locking means are provided for preventing the roller associated with the pivoted guide bar from rolling thereon.

4. Mechanism as claimed in claim 3 in which the locking means comprise a notched slide and means for moving said roller into locking engagement therewith.

5. Mechanism as claimed in claim 4 in which the said notched slide is pivoted to the said frame member and the said pivoted guide bar is carried by said slide, the said guide bar being of channel-shaped construction and having two flanges which partially embrace the said slide and present a surface on either side of the slide for the said roller to roll on, the said roller having a central waisted portion located between said flanges and adapted to engage said slide, and the said guide bar being adapted to be displaced in relation to and parallel with said slide to move the said roller into and out of engagement with the slide.

6. Mechanism for imparting rectilinear movement to a member in opposite directions comprising in combination with the member to be moved, a pair of guide bars pivotally mounted on a fixed frame element and extending in a common plane in a direction generally in the direction of movement of each said member, said guide bar being provided with an inwardly directed extension and said guide bars being relatively adjustable between positions in which they converge towards the said member and diverge from the said member, a pair of rollers mounted on bearing means supported in spaced relationship on the said member so as to engage the outer side of each guide bar, spring means effectively connecting said bearing means for urging the rollers into contact with the corresponding guide bars, and means for controlling the inward end of each of said extensions to rock the said guide bars between the position in which they converge with each other and the position in which they diverge from each other.

7. Mechanism as claimed in claim 6 in which one of the said extensions is arranged to overlap the other, and the means for controlling the position of the inward ends of the said extensions comprise a slotted cam member rotatably mounted on a spindle on said frame element, and a pin cooperating with said cam member and with the said ends of the extensions to displace the said ends in synchronism when the said cam member is rotated.

8. Mechanism as claimed in claim 7 in which locking means are provided for preventing movement of the movable member in relation to the guide bars.

9. Mechanism as claimed in claim 8 in which the spindle upon which the said cam member is mounted is provided with a portion of enlarged diameter having a circumferential slot, and said locking means comprises a lever having one end cooperating with the said member to be moved and at its other end an apertured boss surrounding and larger than the said spindle portion, a casing secured to the said frame element and a coiled spring surrounding the said spindle portion, the said spring being normally expanded against the said lever boss to grip the lever but being contracted out of gripping relationship with said lever boss when the cam spindle is rotated.

FREDERICK CHARLES YOUNG.

REFERENCES CITED

The following references are of record in the file of this patent:

UNITED STATES PATENTS

| Number | Name | Date |
| --- | --- | --- |
| 1,655,052 | Ellery | Jan. 3, 1928 |
| 2,076,938 | Chandler | Apr. 13, 1937 |
| 2,103,876 | Silberman | Dec. 28, 1937 |

FOREIGN PATENTS

| Number | Country | Date |
| --- | --- | --- |
| 213,901 | Great Britain | Nov. 20, 1924 |